United States Patent
Lyssy

(10) Patent No.: US 11,619,757 B2
(45) Date of Patent: Apr. 4, 2023

(54) MODULAR SYSTEM FOR DEPLOYMENT AND RETRIEVAL OF MARINE SURVEY NODES

(71) Applicant: PGS Geophysical AS, Oslo (NO)

(72) Inventor: Matthew Eric Lyssy, Houston, TX (US)

(73) Assignee: PGS Geophysical AS, Oslo (NO)

( * ) Notice: Subject to any disclaimer, the term of this patent is extended or adjusted under 35 U.S.C. 154(b) by 864 days.

(21) Appl. No.: 16/385,223

(22) Filed: Apr. 16, 2019

(65) Prior Publication Data

US 2019/0317235 A1 Oct. 17, 2019

Related U.S. Application Data

(60) Provisional application No. 62/658,128, filed on Apr. 16, 2018.

(51) Int. Cl.
*G01V 1/38* (2006.01)
*B63G 8/00* (2006.01)
*B60L 53/31* (2019.01)

(52) U.S. Cl.
CPC ........... *G01V 1/3817* (2013.01); *B63G 8/001* (2013.01); *G01V 1/3852* (2013.01); *B60L 53/31* (2019.02); *B63G 2008/004* (2013.01); *B63G 2008/008* (2013.01); *G01V 1/3808* (2013.01); *G01V 2210/1427* (2013.01)

(58) Field of Classification Search
CPC .. G01V 1/3817; G01V 1/3852; G01V 1/3808; G01V 2210/1427; B63G 8/001; B63G 2008/004; B63G 2008/008; B63C 1/00; B63B 2035/006–008
See application file for complete search history.

(56) References Cited

U.S. PATENT DOCUMENTS

| | | | |
|---|---|---|---|
| 5,947,051 A | 9/1999 | Geiger | |
| 6,975,560 B2 * | 12/2005 | Berg | G01V 1/3852 367/133 |
| 7,210,556 B2 * | 5/2007 | Bath | G01V 1/16 367/133 |

(Continued)

FOREIGN PATENT DOCUMENTS

EP 3364515 A1 * 8/2018 ........... G01V 11/002

OTHER PUBLICATIONS

Berger, et al., "An Ocean Bottom Seismic Observatory with Near Real-Time Telemetry"; AGU Publications, Earth and Space Science, Published Feb. 5, 2016 (10 pgs) Retrieved from https://agupubs.onlinelibrary.wiley.com/doi/epdf/10.1002/2015EA000137.

(Continued)

*Primary Examiner* — Ian J Lobo

(57) ABSTRACT

An example system can comprise autonomous submarines and an auxiliary station including a power supply. Each autonomous submarine can include a respective power supply and a respective marine survey node coupled thereto. The auxiliary station can be configured to dock the autonomous submarines in a body of water and recharge the respective power supply of each of the autonomous submarines via the power supply of the auxiliary station. Each autonomous submarine can be configured to autonomously navigate from and return to the auxiliary station and position the respective marine survey node on an underwater surface.

21 Claims, 8 Drawing Sheets

(56) References Cited

U.S. PATENT DOCUMENTS

| | | | |
|---|---|---|---|
| 7,632,043 B2* | 12/2009 | Thompson | B63C 11/40 |
| | | | 405/190 |
| 8,492,692 B2 | 7/2013 | Fisher | |
| 8,500,060 B2 | 8/2013 | Grip | |
| 8,717,844 B2 | 5/2014 | Welker et al. | |
| 9,010,678 B1 | 4/2015 | Hiller | |
| 9,056,679 B1 | 6/2015 | Langston et al. | |
| 9,090,319 B2 | 7/2015 | Brizard et al. | |
| 9,096,106 B2 | 8/2015 | Hanson et al. | |
| 9,360,575 B2* | 6/2016 | Etienne | G01V 1/247 |
| 9,448,311 B2* | 9/2016 | Maxwell | G01V 1/18 |
| 9,580,172 B2 | 2/2017 | Hobart et al. | |
| 9,753,169 B2 | 9/2017 | Jewell | |
| 9,841,522 B2 | 12/2017 | Fyffe et al. | |
| 9,845,137 B2* | 12/2017 | Lelaurin | G01V 1/3852 |
| 9,873,494 B2* | 1/2018 | Jewell | B63G 8/08 |
| 9,891,333 B2 | 2/2018 | Valsvik et al. | |
| 10,005,523 B2 | 6/2018 | Dudley | |
| 10,543,892 B2 | 1/2020 | Postic et al. | |
| 10,669,024 B2 | 6/2020 | Wang | |
| 10,670,759 B2* | 6/2020 | Eick | G01V 1/3843 |
| 2011/0217123 A1* | 9/2011 | Jewell | F16L 1/16 |
| | | | 405/158 |
| 2011/0226174 A1 | 9/2011 | Parks | |
| 2014/0301161 A1* | 10/2014 | Brizard | B63G 8/001 |
| | | | 367/15 |
| 2015/0367938 A1 | 12/2015 | Zambrano et al. | |
| 2016/0031275 A1 | 2/2016 | Monroe et al. | |
| 2016/0376000 A1 | 12/2016 | Kohstal | |
| 2017/0137098 A1 | 5/2017 | Valsvik et al. | |
| 2017/0190421 A1 | 7/2017 | Diez-Garias et al. | |
| 2017/0242144 A1 | 8/2017 | Brizard | |
| 2017/0343691 A1 | 11/2017 | Cespedes | |
| 2018/0003836 A1 | 1/2018 | Morris et al. | |
| 2018/0164456 A1 | 6/2018 | Chalenski | |

OTHER PUBLICATIONS

Pai, et al., "Autonomous Vehicles Benefit from 3-D Seismic Arrays"; Hart Energy, Published Sep. 5, 2017 (8 pgs) Retrieved from https://www.epmag.com/autonomous-vehicles-benefit-3-d-seismic-arrays-1656766#p=full.

Researchers at the Johns, "New UAV Can Launch from Underwater for Aerial Missions," https://www.jhuapl.edu/PressRelease/160317 (Johns Hopkins University Mar. 17, 2016).

Siddall, et al., "Wind and water tunnel testing of a morphing aquatic micro air vehicle," Interface Focus 7:20160085 (Royal Society Publishing, 2016).

Wang, et al., "Submersible Unmanned Aerial Vehicle: Configuration Design and Analysis Based on Computational Fluid Dynamics," MATEC Web of Conferences 95, 07023 (ICCME, 2017).

* cited by examiner

MODULAR SYSTEM FOR DEPLOYMENT AND RETRIEVAL OF MARINE SURVEY NODES

CROSS-REFERENCE TO RELATED APPLICATIONS

This application claims priority to U.S. Provisional Application 62/658,128, filed Apr. 16, 2018, which is incorporated by reference as if entirely set forth herein.

BACKGROUND

In the past few decades, the petroleum industry has invested heavily in the development of marine survey techniques that yield knowledge of subterranean formations beneath a body of water in order to find and extract valuable resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

DETAILED DESCRIPTION

Figure 1:
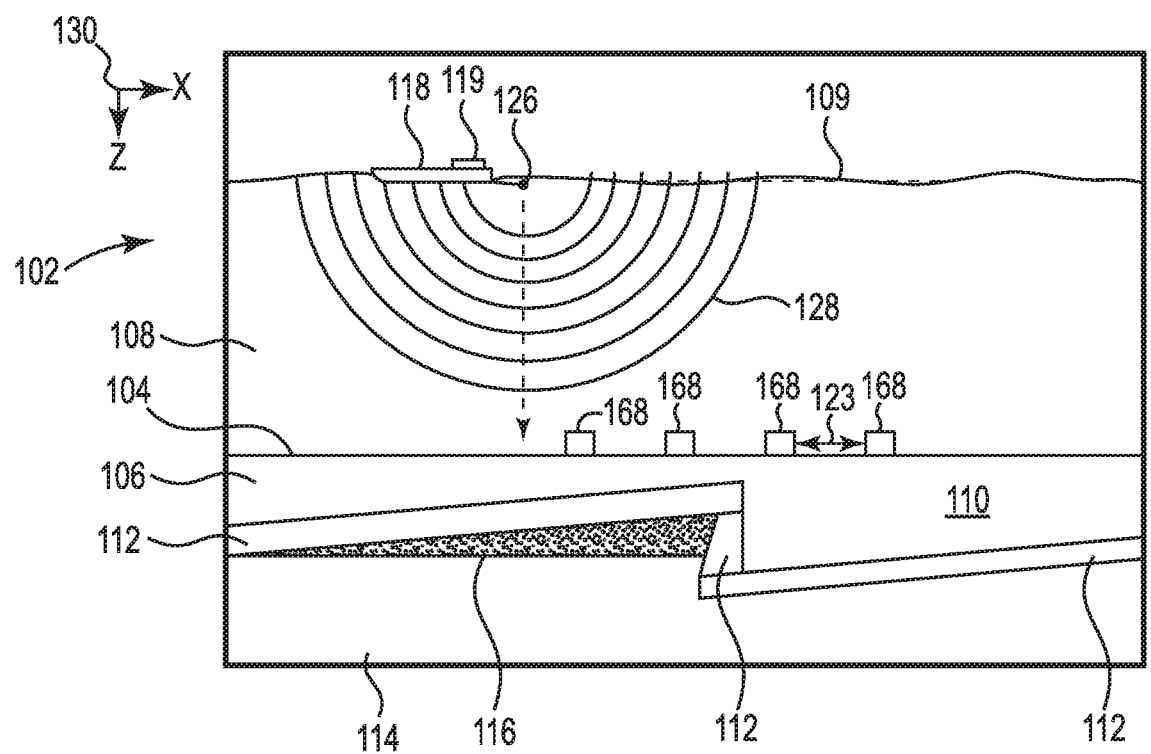
FIG. 1 is an elevation or xz-plane view of marine surveying in which signals are emitted by a source for recording by receivers.

The present disclosure is related to autonomous positioning of marine survey nodes. A marine survey node can be coupled to an autonomous submarine. As used herein, "positioning a marine survey node" refers to positioning a marine survey node onto an underwater surface. In at least one embodiment of the present disclosure, a marine survey node coupled to an autonomous submarine can be integrated into the autonomous submarine such that positioning the marine survey node includes self-positioning the autonomous submarine onto an underwater surface to position the marine survey node coupled thereto onto the underwater surface. In at least one embodiment of the present disclosure, a marine survey node coupled to an autonomous submarine can be separable from the autonomous submarine such that positioning the marine survey node includes decoupling the marine survey node from the autonomous submarine to position the marine survey node previously coupled thereto onto an underwater surface. As used herein, "retrieval of a marine survey node" refers to coupling a marine survey node positioned on an underwater surface to an autonomous submarine and removing the marine survey node from the underwater surface via the autonomous submarine with the marine survey node coupled thereto. As used herein, "deployment of a marine survey node" refers to deploying a marine survey node from an auxiliary station into a fluid volume via an autonomous submarine. As used herein, "auxiliary station" refers to a surface vessel configured to deploy, offload, or deploy and offload marine survey nodes. As used herein, "offloading a marine survey node" refers to decoupling a marine survey node from an autonomous submarine to an auxiliary station by the auxiliary station.

In some previous approaches to positioning of marine survey nodes, marine survey nodes may be deployed manually. Manual deployment of marine survey nodes may be expensive and consume significant resources, such as time and fuel, to position a marine survey node on an underwater surface, such as the seafloor. A surface vessel from which marine survey nodes may be deployed may travel long distances on the water surface to get the marine survey nodes to their respective destinations on the underwater surface. In some previous approaches, each marine survey node may be tethered, at least temporarily, to a surface vessel during positioning of the marine survey node. Thus, a surface vessel may be positioned near or directly above the destination of a marine survey node on the underwater surface and not move from that position or deploy another marine survey node until the marine survey node is positioned onto the underwater surface. Because a marine survey node array can span hundreds or thousands of meters on the underwater surface, it may take several hours or days to manually deploy marine survey nodes from a surface vessel to form a marine survey node array on the underwater surface.

In contrast, at least one embodiment of the present disclosure includes autonomous positioning and retrieval of marine survey nodes. As used herein, "autonomous" modifying a verb refers to performing an action described by the verb with limited or no human interaction or decision making. An example of limited human interaction or decision making can be programing a submarine to perform one or more actions but the submarine performs the one or more actions without any further human interaction or decision making. As used herein, "autonomous" modifying a noun refers to an ability of an object described by the noun to perform one or more actions with limited or no human interaction or decision making.

Autonomous positioning of marine survey nodes can occur without tethering a marine survey node to a surface vessel or positioning a surface vessel directly above a destination of each respective marine survey node on the underwater surface to form a marine survey node array. Rather, multiple marine survey nodes can be deployed from a single location. For example, at least one embodiment includes autonomously navigating one or more autonomous submarines having a marine survey node coupled thereto, from and to an auxiliary station. As used herein, "marine survey vessel" refers to a surface vessel configured to tow a marine survey source, a receiver, or a marine survey source and a receiver during a marine survey. An auxiliary station can be self-propelled or towed by another surface vessel. In at least one embodiment of the present disclosure, the auxiliary station can be autonomous. As used herein, "autonomous auxiliary station" refers to an auxiliary station configured to autonomously navigate and deploy, offload, or deploy and offload marine survey nodes without human intervention. The autonomous submarines can navigate autonomously to a respective destination of the marine survey node coupled thereto and position the marine survey node onto the underwater surface. The autonomous submarines can then return to and dock with the auxiliary station. While docked with the auxiliary station, a power supply of an autonomous submarine can be recharged via a power supply of the auxiliary station. A docked autonomous submarine can receive another marine survey node from the auxiliary station and then navigate from the auxiliary station having the other marine survey node coupled thereto, to a destination of the other marine survey node and position the other marine survey node onto the underwater surface.

A marine survey node positioned onto an underwater surface can be retrieved by an autonomous submarine. For example, a positioned marine survey node can be retrieved after the positioned marine survey node has collected marine survey data. The autonomous submarine can dock with the auxiliary station where the marine survey node can be offloaded by the auxiliary station. The auxiliary station can be at a different location on the water surface than the location from which the autonomous submarine previously navigated. As used herein, "a location" refers to an absolute place, such as may be quantified by earth coordinates or map coordinates, while "a position" refers to a place relative to another place or object. For example, a location may be given by global positioning system (GPS) coordinates, while a position may be given by a distance and heading from another place or object. The auxiliary station can navigate autonomously throughout a marine survey so as to deploy and offload marine survey nodes throughout the marine survey according to a marine survey plan. For example, when positioned marine survey nodes are out of range from a marine survey source, those positioned marine survey nodes can be retrieved from an underwater surface by autonomous submarines and offloaded from the autonomous submarine by an auxiliary station. As a marine survey progresses, marine survey nodes can be deployed from the auxiliary station. The autonomous submarines can navigate from and return to the auxiliary station while the auxiliary station is in motion. The auxiliary station can navigate to a location on the water surface for concurrent offloading of a previously deployed marine survey node with deployment of another marine survey node. The location can be based on, but is not limited to, traffic (for example, routes of marine survey vessels relative to a route of an auxiliary station), tides, currents, and weather conditions.

A power supply of the marine survey node can be recharged via a power supply of the auxiliary station. The marine survey data collected by the marine survey node can be transferred to a data processing system onboard the auxiliary station. The data processing system can generate an image of a subsurface formation based on the marine survey data. Alternatively, the marine survey data can be transferred to a data storage system onboard the auxiliary station for subsequent wired or wireless transmission to another vessel or network.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, reference numeral 372 may reference element "72" in FIG. 3, and a similar element may be referenced as 472 in FIG. 4. Multiple analogous elements within one figure may be referenced with a reference numeral followed by a hyphen and another numeral or a letter. For example, 472-1 may reference element 72-1 in FIG. 4 and 472-2 may reference element 72-2, which can be analogous to element 472-1. Such analogous elements may be generally referenced without the hyphen and extra numeral or letter. For example, elements 472-1 and 472-2 or other analogous elements may be generally referenced as 472. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is an elevation or xz-plane 130 view of marine surveying in which signals are emitted by a source 126, such as a non-impulsive source, for recording by marine survey nodes 168. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the underwater surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. The marine survey vessel 118 can tow one or more sources 126 that produce signals as the marine survey vessel 118 moves across the water surface 109. Although not specifically illustrated, the sources 126 can include at least one marine impulsive source, at least one marine non-impulsive source, or a combination of at least one marine impulsive source and at least one marine non-impulsive source. The sources 126 may also be towed by other vessels or may be otherwise disposed in fluid volume 108. Although illustrated as a point, the source 126 can represent a source string or a source array. The marine survey vessel 118 can include a controller 119. For example, the controller 119 can be coupled to the source 126 and configured to control the source 126. The marine survey vessel 118 can include sensing electronics and data-processing facilities that allow receiver readings to be correlated with absolute positions on the water surface and absolute three-dimensional positions with respect to a three-dimensional coordinate system.

Although not specifically illustrated, the receivers may be located on ocean bottom cables or nodes fixed at or near the underwater surface 104. For example, the receivers can be marine survey nodes. In one type of marine survey, each receiver, such as the marine seismic nodes 168, comprises a pair of sensors including a geophone that detects particle displacement within the water by detecting particle motion variation, such as velocities or accelerations, and/or a receiver, such as a hydrophone, that detects variations in pressure. The marine survey nodes 168 can be arranged on the underwater surface 104 so as to form a marine survey node array. In at least one embodiment, the marine survey node 168 can be positively buoyant and be coupled to an anchor, such as a weight, so that the marine survey node 168 floats above the underwater surface 104. The distance at which the marine survey node 168 floats above the underwater surface 104 can be the length of a rope or cable that couples the anchor to the marine survey node 168.

Characteristics of a marine survey node array can include a quantity of rows of marine survey nodes, a quantity of columns of marine survey nodes, spacing between the columns and rows of the marine survey node array, and a desired location of the marine survey node array (for example, coordinates for positioning of marine survey nodes). The marine survey node array can be rectangular comprising a plurality of rows and columns of the marine survey nodes 168. It can be beneficial to have the marine survey nodes of a marine survey node array to have a set spacing 123 therebetween so as to have a predictable arrangement. Having more information about the location of a marine survey node can increase the accuracy an image of a subsurface formation generated from marine survey data collected by the marine survey nodes 168. As described herein, at least one embodiment of the present disclosure enables marine survey nodes 168 to be positioned precisely on the underwater surface 104 so that more information about the locations of the marine survey nodes 168 is known. Thus, at least one embodiment provides a more accurate image of a subsurface formation than previous approaches. Although FIG. 1 illustrates the spacing 123 between the marine survey nodes 168 in the x-direction, in at least one embodiment the marine survey nodes 168 can have a set spacing in the y-direction or in both the x- and y-directions. As described herein, at least one embodiment of the present disclosure provides more precise and accurate positioning of the marine survey nodes 168 onto the underwater surface 104 such that one or more characteristics of a marine survey node array, such as a spacing of the marine survey nodes 168 of the marine survey node array, are well-defined.

FIG. 1 shows acoustic energy illustrated as an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the underwater surface 104, and the marine survey nodes 168 positioned onto the underwater surface 104, at which point the outward and downward expanding down-going wavefield 128 may partially scatter, may partially reflect back toward the marine survey nodes 168, and may partially refract downward into the subsurface volume 106, becoming elastic signals within the subsurface volume 106.

Figure 2A:
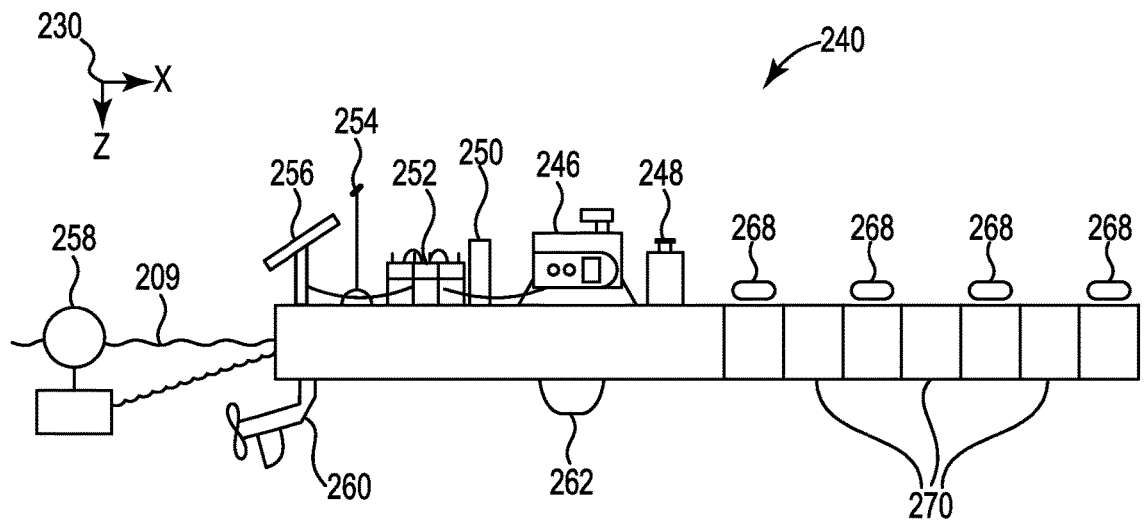
FIG. 2A is an elevation or xz-plane view of an exemplary embodiment of an autonomous auxiliary station for autonomous deployment and offloading of marine survey nodes.
Figure 2B:
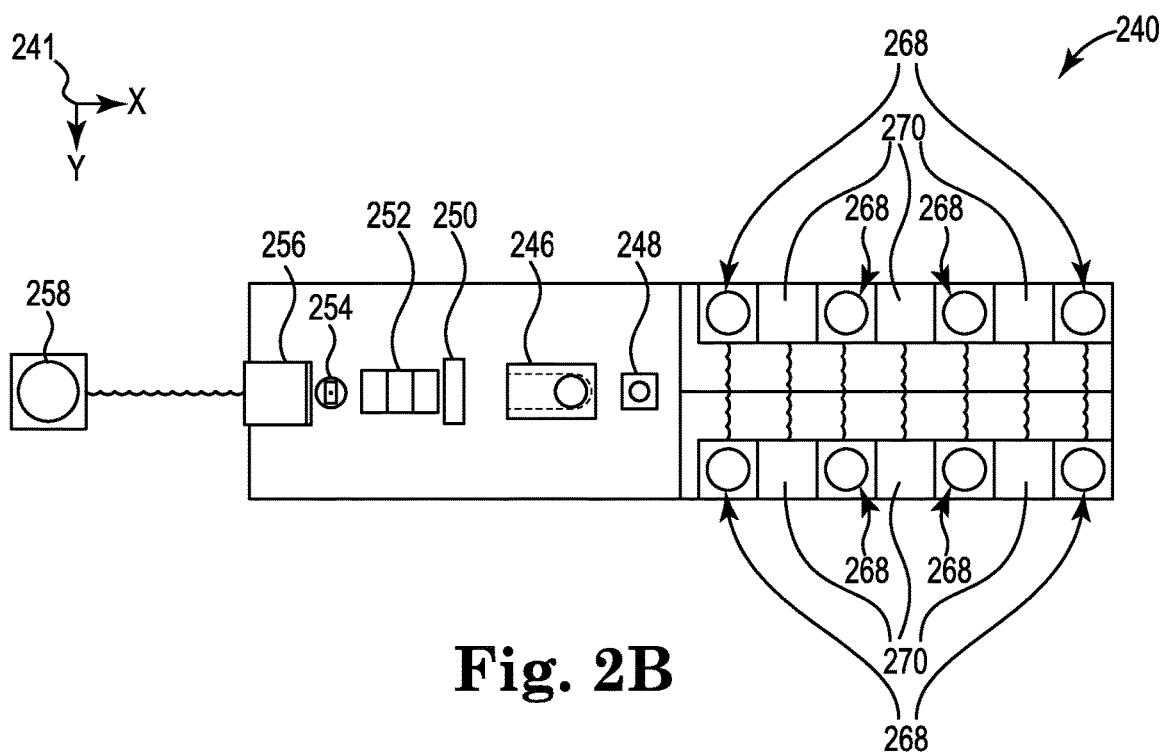
FIG. 2B is a plan or xy-plane view of the exemplary embodiment of an autonomous auxiliary station for autonomous deployment and offloading of marine survey nodes shown in FIG. 2A.

FIG. 2A is an elevation or xz-plane 230 view of an exemplary embodiment of an autonomous auxiliary station 240 for autonomous deployment and offloading of marine survey nodes 268. FIG. 2B is a plan or xy-plane 241 view of the autonomous auxiliary station 240 for autonomous deployment and offloading of the marine survey nodes 268. As illustrated in FIGS. 2A-2B, the autonomous auxiliary station 240 includes a surface vessel with various equipment and systems installed thereon. The autonomous auxiliary station 240 is coupled to a plurality of docks 270. As illustrated in FIGS. 2A-2B, the autonomous auxiliary station 240 is a flat-bottomed surface vessel, such as a barge or platform. However, embodiments of the present disclosure are not limited to the autonomous auxiliary station 240 being flat-bottomed. For example, the autonomous auxiliary station 240 can be a non-flat-bottom surface vessel, such as a boat, with various equipment and systems installed thereon coupled to the docks 270.

In at least one embodiment of the present disclosure, the docks 270 can be fixedly coupled to the autonomous auxiliary station 240. In at least one embodiment of the present disclosure, the docks 270 can be modular. A modular dock can be a self-contained unit. A modular dock can be attached to and detached from another modular dock or the auxiliary station 240. As described herein, the autonomous auxiliary station 240 can include components and systems for navigation, power, data storage, and data processing, for example. Although FIGS. 2A-2B illustrate the autonomous auxiliary station 240 including six docks 270, embodiments of the present disclosure are not so limited. For example, the autonomous auxiliary station 240 can include fewer or greater than six docks 270.

At least one of the docks 270 can be configured to recharge a power supply of a docked autonomous submarine. At least one of the docks 270 can be configured to couple a marine survey node 268 to a docked autonomous submarine. A marine seismic node 268 can be retrieved from a store of marine survey nodes, such as a marine survey node dispenser. At least one of the docks 270 can have a corresponding marine survey node dispenser (not illustrated in FIGS. 2A and 2B for clarity). A marine survey node dispenser can store one or more marine survey nodes 268. For example, a marine survey node dispenser can store a stack of the marine survey nodes 268 with one marine survey node 268 stored on top another. In response to an autonomous submarine docking with the autonomous auxiliary station 240 at one of the docks 270, for example, the corresponding marine survey node dispenser can autonomously dispense a marine survey node 268. Any one of the docks 270 can couple a dispensed marine survey node 268 to an autonomous submarine docked therewith.

At least one of the docks 270 can be configured to offload a marine survey node 268 from a docked autonomous submarine having the marine survey node coupled thereto. An offloaded marine survey node 268 can be placed in a marine survey node dispenser for storage until the offloaded marine survey node 268 is dispensed again for a subsequent deployment. Marine survey data collected by an offloaded marine survey node 268 can be downloaded by the autonomous auxiliary station 240. A power supply of an offloaded marine survey node 268 can be recharged via a power supply of the autonomous auxiliary station 240.

The power supply can include at least one of a fuel-based generator 246, one or more batteries 252, and a renewable energy source such as a solar collector 256, and a wave power generator 258. The autonomous auxiliary station 240 can include a fuel supply 248 coupled to the fuel-based generator 246. As illustrated in FIGS. 2A-2B, the power supply can be onboard or coupled to the autonomous auxiliary station 240. Although FIGS. 2A-2B illustrate the wave power generator 258 on the water surface 209 trailing behind the autonomous auxiliary station 240, embodiments of the present disclosure are not so limited. For example, the wave power generator 258 can be to a side of the autonomous auxiliary station 240. The power supply can recharge a power supply of a docked autonomous submarine or a marine survey node 268. In at least one embodiment, the power supply can include a power storage device and a charging device for the power storage device. The charging device can be configured to recharge a respective power supply of an autonomous submarine, such as an autonomous submarine 372 described in association with FIG. 3, with power stored in the power storage device. The power storage device can be the batteries 252, for example. The charging device can be the fuel-based generator 246, a renewable energy source, or combinations thereof. In at least one embodiment, the charging device can be configured to collect renewable energy from a renewable energy resource (for example, via the solar collector 256 or the wave power generator 258).

The autonomous auxiliary station 240 can include a data processing subsystem 250. The data processing subsystem 250 can include a processing resource, such as a processor, and memory. The memory can be configured to store marine survey data downloaded from one or more marine survey nodes 268. The data processing subsystem 250 can be configured to transfer stored marine survey data to another vessel or network. In at least one embodiment, the data processing subsystem 250 can be configured to autonomously generate an image of a subsurface formation from marine survey data downloaded from one or more marine survey nodes 268.

The autonomous auxiliary station 240 can include a propulsion subsystem 260. As illustrated in FIG. 2A, the propulsion subsystem 260 can include one or more propellers. The propulsion subsystem 260 can include a thruster. The power supply can power the propulsion subsystem 260. For example, the fuel supply 248 can provide fuel to the propulsion subsystem 260 and the fuel-based generator 246 can provide electrical power to the propulsion system 260.

The autonomous auxiliary station 240 can include a location control subsystem. The location control subsystem can include a GPS receiver 254. The location control subsystem can include an acoustic transceiver 262. The acoustic transceiver 262 can be configured to communicate with one or more autonomous submarines. The acoustic transceiver 262 can function analogously to an ultra-short baseline (USBL) system or an inverted USBL (iUSBL) system. The term "USBL system" is used herein to generically cover both USBL and iUSBL systems. A typical USBL system can include a transceiver mounted on a marine survey vessel, such as the autonomous auxiliary station 240, and a transponder or responder on other equipment, such as an autonomous submarine 372 described in association with FIG. 3. The USBL system can include processing resources and memory resources configured to calculate the position of the source equipment from the ranges and bearing measured by the transceivers in the USBL system. The transceivers can emit acoustic pulses that are detected by the transponders or responders, which can reply with their own acoustic pulse. The transceiver can detect the return pulse. The time from transmission of the initial acoustic pulse until the reply can be detected and measured by the USBL system and converted into a range. The USBL system can also calculate an angle from the transceiver to the transponder or responder using, for example, phase differencing from an array of transducers in the transceiver.

Although not illustrated in FIGS. 2A-2B, at least one of the docks 270 can include an interface for docking an autonomous submarine with the dock. The interface can be configured to transfer power from the power supply of the autonomous auxiliary station 240 to a power supply of a docked autonomous submarine. The interface can be configured to transfer data from a docked autonomous submarine to the data processing subsystem 250 via a wired or wireless connection to the docked autonomous submarine. The data can include coordinates of a marine survey node previously positioned onto an underwater surface by a docked autonomous submarine. The data can include diagnostic data from a docked autonomous submarine. The diagnostic data can include an energy level of a power supply of the docked autonomous submarine, status of a propulsion system of a docked autonomous submarine, and other status information or error messages regarding systems of a docked autonomous submarine, for example. The interface can be configured to transfer instructions to a docked autonomous submarine for positioning of a marine seismic node coupled thereto.

The interface can be configured to resupply a docked autonomous submarine. For example, the interface can transfer fuel to a docked autonomous submarine. The interface can be configured to transfer compressed air to a docked autonomous submarine. As described herein, compressed air can be used to drive out water in a ballast tank of an autonomous submarine. The interface can be configured to transfer power from the power supply of the autonomous auxiliary station 240 to a power supply of a docked autonomous submarine. The power transfer can occur in a wired or wireless fashion, such as by inductive charging. The interface can be configured to wired or wirelessly transfer data from a docked autonomous submarine to the data processing subsystem 250. The data can include coordinates of a marine survey node previously positioned by a docked autonomous submarine and diagnostic data from a docked autonomous submarine, such as an energy level of a power supply of the docked autonomous submarine, status of a propulsion system of a docked autonomous submarine, and other status information or error messages regarding systems of a docked autonomous submarine. The interface can be configured to wired or wirelessly transfer instructions to a docked autonomous submarine for positioning of a marine seismic node. The interface can include a physical coupling configured to couple to a docked autonomous submarine.

In at least one embodiment of the present disclosure, the autonomous auxiliary station 240 can be transported onboard a marine survey vessel (for example, the marine survey vessel 118 described in association with FIG. 1) and deployed from the marine survey vessel. For example, when a marine survey vessel approaches a site for a marine survey, the autonomous auxiliary station 240 can be positioned onto the water surface 209 from the marine survey vessel.

Figure 3:
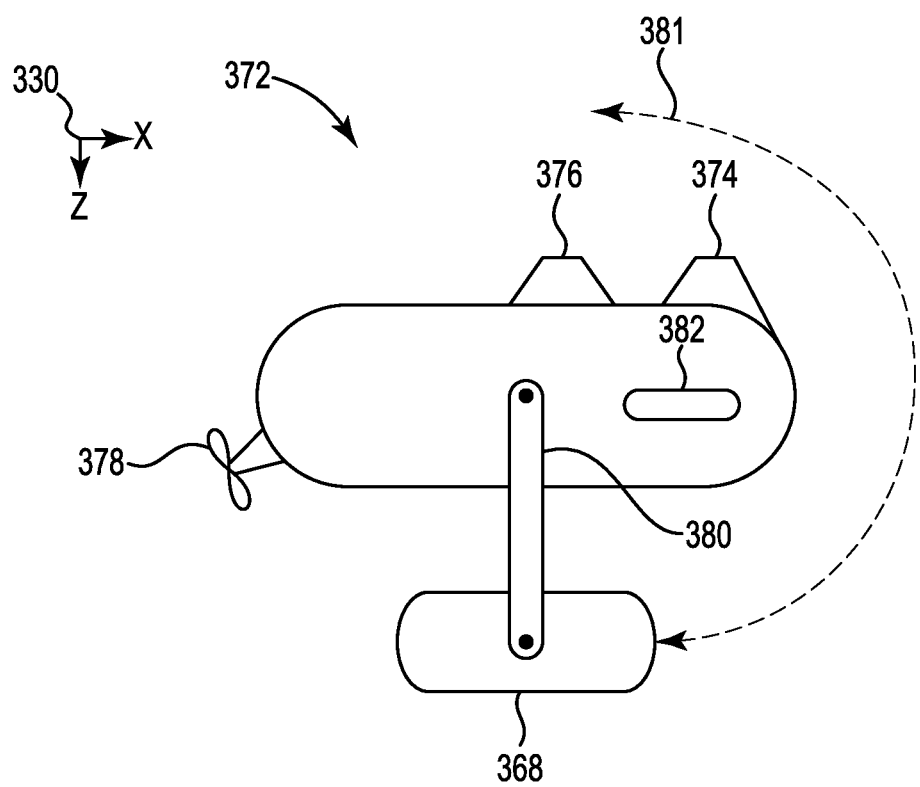
FIG. 3 is an elevation or xz-plane view of an exemplary embodiment of an autonomous submarine for autonomous deployment and offloading of marine survey nodes.

FIG. 3 is an elevation or xz-plane 330 view of an exemplary embodiment of an autonomous submarine 372 for autonomous positioning and retrieval of a marine survey node 368. The autonomous submarine 372 can include a ballast tank for controlling the depth of the autonomous submarine 372. In at least one embodiment, compressed air stored onboard the autonomous submarine 372 can be used to force water out of the ballast tank, thereby causing the autonomous to ascend. The autonomous submarine 372 can be configured to withstand hydrostatic and hydrodynamic pressures associated with navigating from a water surface, such as the water surface 109 illustrated in FIG. 1, to an underwater surface, such as the underwater surface 104. The underwater surface can be at a depth of three to three thousand meters relative to the water surface, for example.

The autonomous submarine 372 can be configured to autonomously dock with an auxiliary station, such as the autonomous auxiliary station 240 described in association with FIGS. 2A-2B. The autonomous submarine 372 can be configured to receive a marine survey node from an auxiliary station while docked with the auxiliary station. The autonomous submarine 372 can be configured to autonomously navigate from and return to an auxiliary station with or without the marine survey node 368 being coupled thereto. At least one marine survey node 368 is coupled to the autonomous submarine. In at least one embodiment of the present disclosure, one or more marine survey nodes 368 coupled to the autonomous submarine 372 can be integrated into the autonomous submarine 372. In at least one embodiment of the present disclosure, one or more marine survey nodes 368 coupled to the autonomous submarine 372 can be separable from the autonomous submarine 372. The autonomous submarine 372 can be configured to position one or more marine survey nodes 368 coupled thereto onto an underwater surface.

In at least one embodiment of the present disclosure, the marine survey node 368 can be positively buoyant and be coupled to an anchor, such as a weight. The anchor can be positioned onto an underwater surface to position the marine survey node 368 above the underwater surface. The anchor can be coupled to the marine survey node 368 via a rope or cable. The length of the rope or cable can set the distance at which the marine survey node 368 floats above the underwater surface. The positive buoyancy of the marine survey node 368 can keep the rope or cable taut so that the marine survey node 368 is directly above the anchor. Thus, the location of the anchor on the underwater surface can accurately describe the location of the marine survey node 368. Therefore, precisely positioning the anchor onto the underwater surface effectively precisely positions the marine survey node 368.

The autonomous submarine 372 can include one or more hydroplanes 382. The autonomous submarine 372 can include a propulsion system 378. As illustrated in FIG. 3, the propulsion system 378 can include one or more propellers. In at least one embodiment, the propulsion system 378 can include a thruster or other suitable propulsion system. In some previous approaches in which marine survey nodes may be deployed from a water surface, for example, via a tether coupled to a surface vessel, precise positioning of a marine survey node onto the underwater surface may be difficult, if not impossible, because sea conditions and underwater currents can affect the positioning of a tether from the water surface to the underwater surface and positioning of a marine survey node via the tether. In contrast, at least one embodiment of the present disclosure enables a marine survey node to be positioned directly onto the underwater surface at a set of underwater surface coordinates. Further, at least one embodiment of the present disclosure enables a marine survey node to be positioned directly above the underwater surface (such as by coupling the node to an anchor and positioning the anchor at the set of underwater surface coordinates). For example, the hydroplanes 382 and the propulsion system 378 can enable the autonomous submarine 372 to precisely position the marine survey node 368 onto the underwater surface.

The autonomous submarine 372 can include a mechanism for coupling and decoupling the marine survey node 368 that is separable from the autonomous submarine 372. As illustrated in FIG. 3, the autonomous submarine 372 can include an arm 380 for coupling and decoupling the marine survey node 368 that is separable from the autonomous submarine 372. In at least one embodiment of the present disclosure, the end of the arm 380 that couples to the marine survey node 368 can include a solenoid configured to move a pin at the end of the arm 380. The solenoid can be configured to retract the pin for positioning of the marine survey node 368 onto an underwater surface and extend the pin for retrieving the marine survey node 368 from an underwater surface.

As indicated by the arrow 381, the arm 380 can rotate about the autonomous submarine 372. For example, the arm 380 can be in the position as illustrated in FIG. 3 so that the marine survey node 368 is positioned below the autonomous submarine 372 for positioning of the marine survey node 368 onto the underwater surface. The arm 380 can be in the position as illustrated in FIG. 3 so that an end of the arm 380 is positioned below the autonomous submarine 372 for retrieval of a marine survey node from the underwater surface. The arm 380 can move as indicated by the arrow 381 so that the marine survey node 368 is positioned above the autonomous submarine 372 for offloading the marine survey node 368 to an auxiliary station, such as the autonomous auxiliary station 240 illustrated in FIGS. 2A-2B. An end of the arm 380 can positioned above the autonomous submarine 372 for receiving a marine survey node from an auxiliary station coupling that marine survey node to the autonomous submarine 372. In at least one embodiment, the autonomous submarine 372 can offload the marine survey node 368 to the auxiliary station or receive the marine survey node 368 from the auxiliary station by operation of the arm 380 without the autonomous submarine 372 otherwise being physically coupled to the auxiliary station.

In at least one embodiment of the present disclosure, the arm 380 can be used to position an anchor coupled to a positively buoyant marine survey node 368 onto an underwater surface. The end of the arm 380 that couples to the anchor can include a solenoid configured to move a pin at the end of the arm 380. The solenoid can be configured to retract the pin for positioning of the anchor onto an underwater surface and extend the pin for retrieving the anchor from an underwater surface.

Although FIG. 3 illustrates the autonomous submarine 372 including the arm 380 as a mechanism for coupling and decoupling the marine survey node 368 that is separable from the autonomous submarine 372, embodiments of the present disclosure are not so limited. For example, the autonomous submarine 372 can include a compartment, internal or external to the body of the autonomous submarine 372, configured to house the marine survey node 368. In at least one embodiment, the autonomous submarine 372 can include a physical coupling mechanism for coupling and decoupling the marine survey node 368. Examples of such a coupling mechanism include a magnetic lock, a mechanical lock, a pneumatic lock, and other types of locks and clamps.

Although not specifically illustrated in FIG. 3, the marine survey node 368 can be integrated into the autonomous submarine 372 as opposed to separable from the autonomous submarine 372. In at least one embodiment, the marine survey node 368 is a component of the autonomous submarine 372 and is not separable from the autonomous submarine 372. Thus, in at least one embodiment, the autonomous submarine 372 does not include a mechanism for coupling and decoupling the marine survey node 368, such as the arm 380, because positioning the autonomous submarine 372 onto an underwater surface positions the marine survey node 368 onto the underwater surface and navigating the autonomous submarine 372 off of the underwater surface retrieves the marine survey node 368 from the underwater surface. The autonomous submarine 372 can be configured to self-position onto the underwater surface to position the marine survey node 368 onto the underwater surface.

The autonomous submarine 372 can include a locating device 374. The locating device 374 can be, for example, an acoustic transceiver. The locating device 374 can be configured to communicate with other vessels. For example, the autonomous submarine 372 can use the locating device 374 to determine a position of the autonomous submarine 372 relative to another vessel, such as the autonomous auxiliary station 240 illustrated in FIGS. 2A-2B, or other autonomous submarines. The acoustic transceiver can be part of a USBL system such as that described in association with FIG. 2A. As described in association with FIG. 4, the autonomous submarine 372 can use the locating device 374 to determine a position of the autonomous submarine 372 relative to another autonomous submarine to precisely position the marine survey node 368 onto the underwater surface relative to a different marine survey node positioned onto the underwater surface. As described in association with FIG. 4, the autonomous submarine 372 can use the locating device 374 to determine a position of the autonomous submarine 372 relative to an autonomous auxiliary station to facilitate docking of the autonomous submarine 372 with the autonomous auxiliary station. Although not illustrated in FIG. 3, the marine survey node 368 can include a locating device, such as an acoustic transceiver, to determine a position of the marine survey node 368 relative to the autonomous submarine 372 or another marine survey node.

Although FIG. 3 illustrates the locating device 374 located on the top and forward of the autonomous submarine 372, embodiments of the present disclosure are not so limited. For example, the locating device 374 can be located on the top and aft of the autonomous submarine 372. In at least one embodiment, the autonomous submarine 372 can include a locating device located on the bottom of the autonomous submarine 372.

The autonomous submarine 372 can include a docking interface 376. The docking interface 376 can be configured to couple the autonomous submarine 372 to an auxiliary station, such as the autonomous auxiliary station 240 illustrated in FIGS. 2A-2B. The docking interface 376 can complement the interface of the docks 270 described in association with FIGS. 2A-2B. The docking interface 376 can be configured to receive power from a power supply of an auxiliary station to recharge a power supply of the autonomous submarine 372. The docking interface 376 can be configured to transfer data from the autonomous submarine 372 to an auxiliary station. The docking interface 376 can be configured to receive instructions from an auxiliary station.

Figure 4:
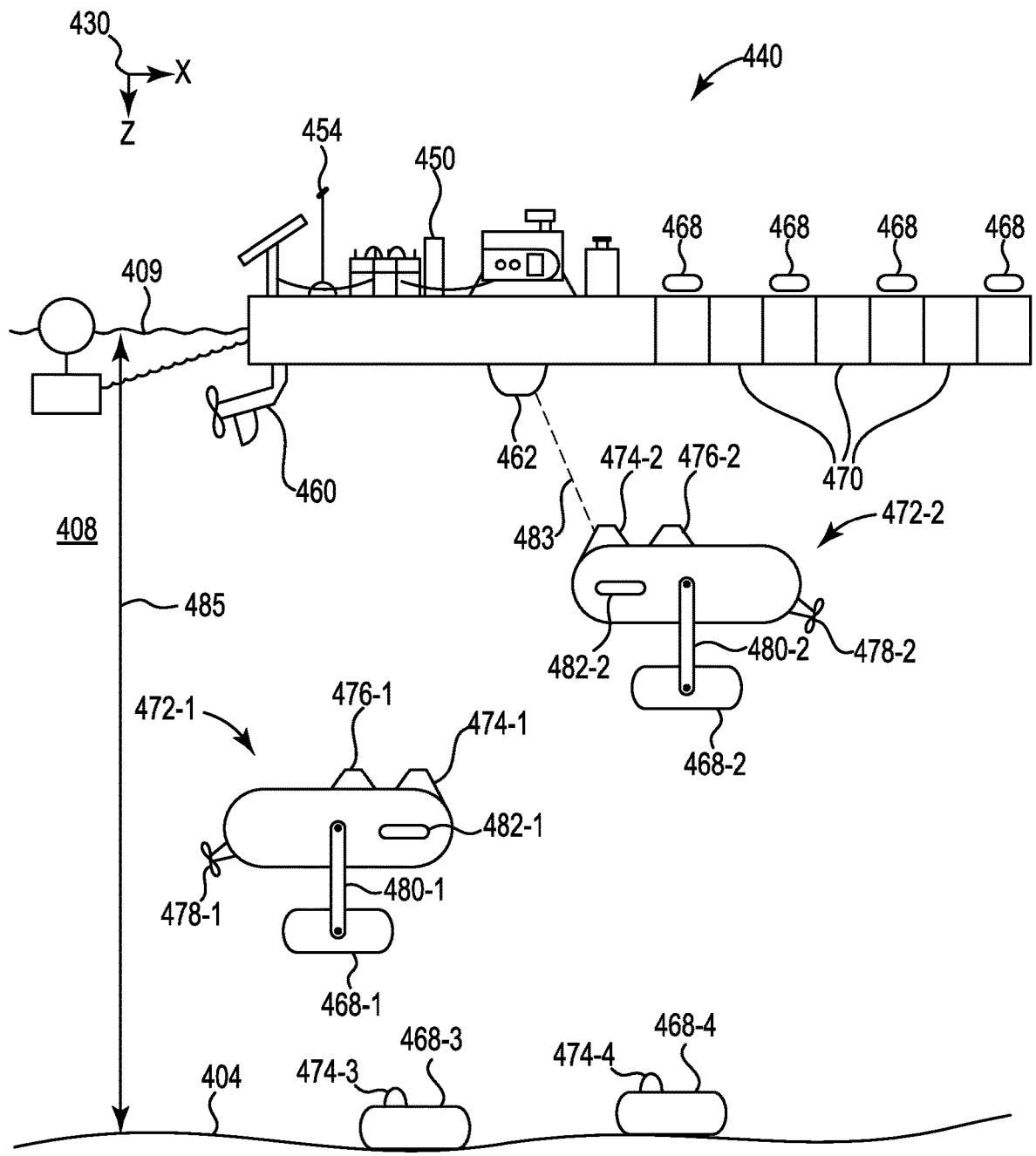
FIG. 4 is an elevation or xz-plane view of an exemplary embodiment of a system for autonomous deployment and offloading of marine survey nodes.

FIG. 4 is an elevation or xz-plane 430 view of an exemplary embodiment of a system for autonomous positioning and retrieval of marine survey nodes 468. The autonomous auxiliary station 440 can be analogous to the autonomous auxiliary station 240 described in association with FIGS. 2A-2B. As such, descriptions of components and subsystems of the autonomous auxiliary station 440 may not be repeated here.

Each of the autonomous submarines 472 can be analogous to the autonomous submarine 372 described in association with FIG. 3. In the example illustrated in FIG. 4, the first autonomous submarine 472-1 is positioning a first marine survey node 468-1 coupled thereto and the second autonomous submarine 472-2 has retrieved a second marine survey node 468-2 from the underwater surface 404. A third marine survey node 468-3 and a fourth marine survey nodes 468-4 are already positioned onto the underwater surface 404.

The first autonomous submarine 472-1 can navigate from any one of the docks 470 of the autonomous auxiliary station 440 with the first marine survey node 468-1 coupled thereto. The first autonomous submarine 472-1 can navigate from the water surface 409 (for example, a sea surface) through a fluid volume 408 to an underwater surface 404 (for example, a seafloor). The underwater surface 404 can be at a depth (indicated by the arrow 485) of X-Y meters relative to the water surface 409. The first autonomous submarine 472-1 can navigate to a set of coordinates on the underwater surface 404. The first autonomous submarine 472-1 can use its propulsion system 478-1 to hover above the set of the coordinates. Once at a desired location near the underwater surface 404, the first autonomous submarine 472-1 can decouple the marine survey node 468-1 to position the first marine survey node 468-1 onto the underwater surface 404. For example, the arm 480-1 of the first autonomous submarine 472-1 can be configured to decouple the first marine survey node 468-1 thereby positioning the first marine survey node 468-1 onto the underwater surface 404. Although not specifically illustrated, marine survey nodes 468 can include an anchor to secure a marine survey node 468 to the underwater surface 404.

Although not specifically illustrated in FIG. 4, the marine survey node 468-1 can be integrated into the autonomous submarine 472-1. In at least one embodiment, positioning the marine survey node 468-1 that is integrated into the autonomous submarine 472-1 onto the underwater surface 404 can include self-positioning the autonomous submarine 472-1 onto the underwater surface 404.

In some previous approaches, determining a location of a submarine may include using GPS coordinates of the submarine at a water surface either when the submarine surfaces or with the use of an antenna or periscope at the water surface. The location of the submarine when submerged can be determined using the location information from the water surface supplemented with dead reckoning course information, inertial navigation systems, and/or bottom contour navigation to estimate the location of the submerged submarine. In contrast, the autonomous submarines 472 as described herein can be configured to determine their location by determining their position relative to one or more other vessels for which location information is available, such as the autonomous auxiliary station 440 (by operation of the GPS receiver 454 of the autonomous auxiliary station 440). A location control subsystem of the autonomous auxiliary station 440 can include the GPS receiver 454 and the acoustic transceiver 462. The autonomous auxiliary station 440 can be configured to use the GPS receiver 454 determine a location of the autonomous auxiliary station 440.

The autonomous submarines 472 can be configured to determine their position relative to one or more other vessels by operation of the acoustic transceivers of the vessels. For example, the first autonomous submarine 472-1 can use its locating device 474-1 in conjunction with the acoustic transceiver 462 of the autonomous auxiliary station 440 to determine its position while submerged relative to the autonomous auxiliary station 440. The first autonomous submarine 472-1 can use its locating device 474-1 in conjunction with the locating device 474-2 of the second autonomous submarine 472-2 to determine its position relative to the second autonomous submarine 472-2. The first autonomous submarine 472-1 can use its locating device 474-1 in conjunction with the locating device 474-3 of the third marine survey node 468-3 already positioned onto the underwater surface 404 to determine its position while submerged relative to the third marine survey node 468-3. The marine survey nodes 468 can include their own locating devices 474. Although not specifically illustrated in FIG. 4, the first and second marine survey nodes 468-1 and 468-2 can each include a respective locating device, such as a respective acoustic transceiver.

The autonomous submarines 472 can be configured to communicate with other autonomous submarines 472 and the marine survey nodes 468. The first autonomous submarine 472-1 can use acoustic communication to determine a position of the first autonomous submarine 472-1 relative to other autonomous submarines 472 and marine survey nodes 468 to precisely position the first marine survey node 468-1 according to a marine survey plan. The marine survey plan can include characteristics of a marine survey node array. Characteristics of a marine survey node array can include a quantity of rows of marine survey nodes 468, a quantity of columns of the marine survey nodes 468, spacing between the columns and rows of the marine survey node array, and a desired location of the marine survey node array. The desired location of the marine survey node array can include the set of underwater surface coordinates where the marine survey nodes 468 are to be positioned. By using acoustic communication to determine a position of the first autonomous submarine 472-1 relative to other autonomous submarines 472 or the marine survey nodes 468, the first autonomous submarine 472-1 can position the first marine survey node 468-1 to precisely form a marine survey node array according to a marine survey plan.

A marine survey plan can include a survey route. As used herein, "survey route" refers to a planned route of a marine survey vessel towing a source. Depending on the survey route, at a moment of time during a marine survey, some marine survey nodes of a marine survey node array may be too far away from the source to collect marine survey data. Some marine survey nodes of a marine survey node array can be positioned onto the underwater surface 404 before other marine survey nodes of the marine survey node array are positioned based on the survey route. For example, if a marine survey vessel is sailing from north to south, then marine survey nodes at the north end of a marine survey node array can collect marine survey data before marine survey nodes at the south end of the marine survey node array. Thus, the marine survey nodes at the north end of the marine survey node array can be positioned onto the underwater surface 404 before the marine survey nodes at the south end of the marine survey node array. Conversely, the marine survey nodes at the north end of the marine survey node array can be retrieved from the underwater surface 404 before the marine survey nodes at the south end of the marine survey node array.

In the example of FIG. 4, the second autonomous submarine 472-2 has retrieved the second marine survey node 468-2 from the underwater surface 404. The arm 480-2 of the second autonomous submarine 472-2 can be configured to couple to a marine survey node 468. The second autonomous submarine 472-2 can navigate to a set of coordinates on the underwater surface 404 at which the second marine survey node 468-2 was positioned. For example, the navigation can include the use of the locating device 474-2 to determine a position of the second autonomous submarine 472-2 relative to the location of the autonomous auxiliary station 440, and thereby, a location of the second autonomous submarine 472-2. The second autonomous submarine 472-2 can use its propulsion system 478-2 to hover above the set of the coordinates. Once at the location at which the second marine survey node 468-2 was positioned onto the underwater surface 404, the second autonomous submarine 472-2 can retrieve the second marine survey node 468-2 from the underwater surface 404. After the second marine survey node 468-2 has been coupled to the second autonomous submarine 472-2, via the arm 480-2, for example, the second autonomous submarine 472-2 can navigate from the underwater surface 404 through the fluid volume 408 towards the water surface 409. The second autonomous submarine 472-2 with the second marine survey node 468-2 coupled thereto can dock with the autonomous auxiliary station 440. The second autonomous submarine 472-2 can be configured to use its locating device 474-2 to communicate with the autonomous auxiliary station 440 via the acoustic transceiver 462. As indicated by the dashed line 483, the second autonomous submarine 472-2 can use acoustic communication to determine a position of the second autonomous submarine 472-2 relative to the autonomous auxiliary station 440 to navigate to one of the docks 470 of the autonomous auxiliary station 440.

Although not specifically illustrated in FIG. 4, the marine survey node 468-2 can be integrated into the autonomous submarine 472-2. In at least one embodiment, retrieving the marine survey node 468-2 that is integrated into the autonomous submarine 472-2 can include navigating the autonomous submarine 472-2 off of the underwater surface 404.

As described above in association with FIGS. 2A-2B, a number of operations can be performed while an autonomous submarine 472 is docked with the autonomous auxiliary station 440. For example, a power supply of any one of the autonomous submarines 472 can be recharged by a power supply onboard the autonomous auxiliary station 440. After the autonomous submarine 472 has docked with the autonomous auxiliary station 440, the marine survey node 468 can be retrieved by the autonomous auxiliary station 440. As illustrated in FIG. 3, the marine survey nodes 468 can be rotated about the autonomous submarines 472. Positioning a marine survey node (for example, the second marine survey node 468-2) above an autonomous submarine (for example, the second autonomous submarine 472-2) can facilitate retrieval of the second marine survey node 468-2 by the autonomous auxiliary station 440. The second marine survey node 468-2 offloaded from the second autonomous submarine 472-2 can be placed in a corresponding marine survey node dispenser of one of the docks 470.

In at least one embodiment, after the second marine survey nodes 468-2 has been offloaded from the second autonomous submarine 472-2 while docked with the autonomous auxiliary station 440, a different marine survey node 468 can be coupled to the second autonomous submarine 472-2. For example, the different marine survey node 468 can be coupled to the arm 480-2 of the second autonomous submarine 472-2. The arm 480-2 can then be rotated about the second autonomous submarine 472-2 so that the different marine survey node 468 is positioned below the second autonomous submarine 472-2, which can facilitate positioning of the different marine survey node 468 onto the underwater surface 404. The second autonomous submarine 472-2 can navigate from the autonomous auxiliary station 440, with the different marine survey node 468 coupled thereto, and position the different marine survey node 468 onto the underwater surface 404 as described with respect to the first autonomous submarine 472-1.

Although FIG. 4 illustrates two autonomous submarines 472, embodiments of the present disclosure are not so limited. For example, fewer or greater than two autonomous submarines 472 can be used for autonomous positioning and retrieval of marine survey nodes. A marine survey node array can span thousands of meters. Thus, at least one embodiment of the present disclosure including a plurality of the autonomous submarines 472 served by the autonomous auxiliary station 440 can increase the efficiency of a marine survey by reducing the amount of time to form a marine survey node array. The quantity of the autonomous submarines 472 that the autonomous auxiliary station 440 can serve is not necessarily limited to the quantity of the docks 470.

In at least one embodiment, multiple marine survey nodes 468 can be coupled to a single autonomous submarine, such as the autonomous submarine 472-1. For example, two, four, or ten marine survey nodes 468 can be coupled to the autonomous submarine 472-1. The multiple marine survey nodes 468 can be separable from the autonomous submarine 472-1, integrated into the autonomous submarine 472-1, or a first subset of the multiple marine survey nodes 468 can be separable from the autonomous submarine 472-1 and a second subset of the multiple marine survey nodes 468 can be integrated into the autonomous submarine 472-1. When docked with the autonomous auxiliary station 440, multiple marine survey nodes can be dispensed from a marine survey node dispenser onboard the auxiliary station 440 and coupled to the autonomous submarine 472-1 as described herein. The autonomous submarine 472-1 can be deployed from the autonomous auxiliary station 440. The autonomous submarine can position all or some of the multiple marine survey nodes 468 coupled thereto onto the underwater surface 404. Subsequently, the autonomous submarine 472-1 can return to the autonomous auxiliary station 440, or another auxiliary station, and another multiple marine survey nodes 468 can be coupled to the autonomous submarine 472-1 for subsequent positioning onto the underwater surface 404.

At least one embodiment of the present disclosure can increase the efficiency of a marine survey because an autonomous submarine (for example, the first autonomous submarine 472-1) can position a marine survey node (for example, the marine survey node 468-1) and retrieve another marine survey node 468 in a single round trip from and to an autonomous auxiliary station 440. For example, the first autonomous submarine 472-1 can navigate from one of the docks 470 of the autonomous auxiliary station 440 to the underwater surface 404 to position the first marine survey node 468-1. After the first marine survey node 468-1 has been positioned onto the underwater surface 404, the first autonomous submarine 472-1 can retrieve a different marine survey node that has been positioned onto the underwater surface 404 (for example, the third marine survey node 468-3) as described with respect to the second autonomous submarine 472-2. After the third marine survey node 468-3 has been retrieved by the first autonomous submarine 472-1, the first autonomous submarine 472-1 can navigate from the underwater surface 404 to the water surface 409 to dock with the autonomous auxiliary station 404.

In at least one embodiment, more than one auxiliary station (for example, multiple autonomous auxiliary stations 440) can serve a plurality of the autonomous submarines 472. For example, the first autonomous submarine 472-1 can navigate from the autonomous auxiliary station 440 with the first marine survey node 468-1, position the first marine survey node 468-1 onto the underwater surface 404, retrieve the third marine survey node 468-3, and dock with a different auxiliary station other than the autonomous auxiliary station 440.

The autonomous auxiliary station 440 can be configured to use the GPS receiver 454 determine a location of the autonomous auxiliary station 440 relative to a location of a marine survey node array according to a marine survey plan. The autonomous auxiliary station 440 can be configured to activate and direct the propulsion system 460 based on the determined location.

The location control subsystem of the autonomous auxiliary station 440 can be configured determine a position of the autonomous auxiliary station 440 relative to any one of the autonomous submarines 472, for example, using the acoustic transceiver 462. The location control subsystem can be configured to activate and direct the propulsion system 460 to move the autonomous auxiliary station 440 based on the determined position, a marine survey plan, or combinations thereof. The location control subsystem can be configured to determine a position of the autonomous auxiliary station 440 relative to an autonomous submarine not docked with the autonomous auxiliary station 440, such as the autonomous submarines 472-1 and 472-2, and determine a rendezvous location based on the determined location and the determined position of the autonomous auxiliary station 440. The location control subsystem can be configured to activate and direct the propulsion subsystem 460 to move the autonomous auxiliary station 440 to the rendezvous location. The autonomous auxiliary station 440 can be configured to dock with an autonomous submarines not docked with the autonomous auxiliary station 440 at the rendezvous location. Such operation of the autonomous auxiliary station 440 can reduce a distance that an autonomous submarine, such as the second autonomous submarine 472-2, navigates between a location on the underwater surface 404 at which a marine survey node, such as the second marine survey node 468-2, is retrieved and the autonomous auxiliary station 440. The location control subsystem can be configured to determine a deployment location based on the marine survey plan and the rendezvous location, and activate and direct the propulsion subsystem 460 to move the autonomous auxiliary station 440 to the deployment location. The autonomous auxiliary station 440 can be configured to deploy an autonomous submarine docked with the autonomous auxiliary station 440 at the deployment location. Such operation of the autonomous auxiliary station 440 can reduce a distance that an autonomous submarine navigates from the autonomous auxiliary station 440 to a location above the underwater surface 404 at which one of the marine survey nodes 468 is to be positioned.

In at least one embodiment of the present disclosure, the autonomous auxiliary station 440 can be configured to determine a position of the autonomous auxiliary station 440 relative to a marine survey node array and a position of the autonomous auxiliary station 440 relative to any one of the autonomous submarines 472 to determine a location on the water surface 404 that reduces both a distance that an autonomous submarine, such as the first autonomous submarine 472-1, navigates from the autonomous auxiliary station 440 to a location on the underwater surface 404 at which one of the marine survey nodes 468 is positioned and a distance that one of the autonomous submarines 472 navigates from a location on the underwater surface 404 at which a marine survey node 468 is retrieved.

Figure 5:
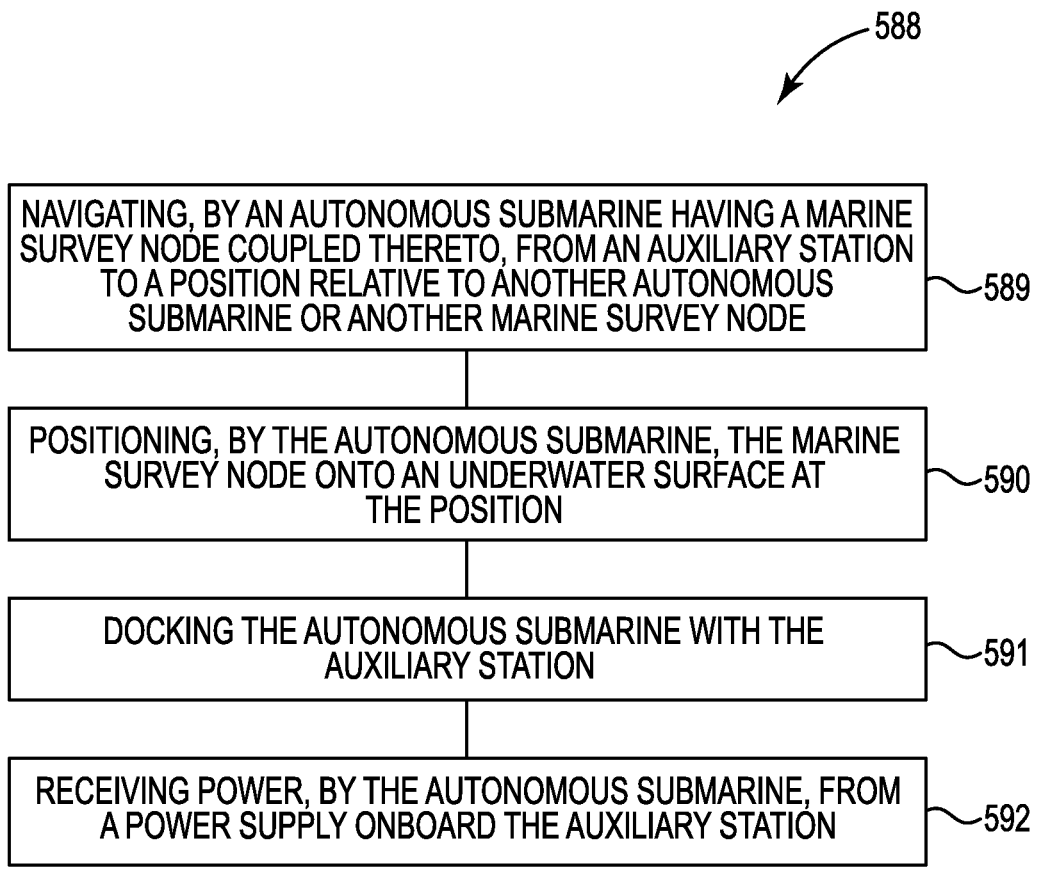
FIG. 5 illustrates an exemplary embodiment of a method for autonomous positioning of marine survey nodes.

FIG. 5 is an exemplary embodiment of a method 588 for autonomous positioning of marine survey nodes. At 589, the method 588 can include navigating, by an autonomous submarine having a marine survey node coupled thereto, from an auxiliary station to a position relative to another autonomous submarine or another marine survey node. Navigating to the position can include determining a position of the autonomous submarine relative to the other autonomous submarine or the other marine survey node via acoustic communication between the autonomous submarine and the other autonomous submarine or the other marine survey node. Navigating to the position can include determining a location of the autonomous submarine relative to a marine survey plan. The marine survey plan can be created before the autonomous submarine begins navigating from the auxiliary station.

At 590, the method 588 can include positioning, by the autonomous submarine, the marine survey node onto an underwater surface at the position. At 591, the method 588 can include docking the autonomous submarine with the auxiliary station. At 592, the method 588 can include receiving power, by the autonomous submarine, from a power supply onboard the auxiliary station.

Although not illustrated in FIG. 5, in at least one embodiment, the method 588 can include receiving, by the autonomous submarine, a different marine survey node from the auxiliary station subsequent to docking. In at least one embodiment, the method 588 can include, the auxiliary station retrieving the different marine survey node from a plurality of marine survey nodes onboard the auxiliary station prior to autonomously coupling, by the auxiliary station, the different marine survey node to the autonomous submarine. The method 588 can include navigating, by the autonomous submarine with the different marine survey node coupled thereto, from the auxiliary station and positioning, by the autonomous submarine, the different marine survey node onto the underwater surface at a different position relative to the previously positioned marine survey node.

Figure 6:
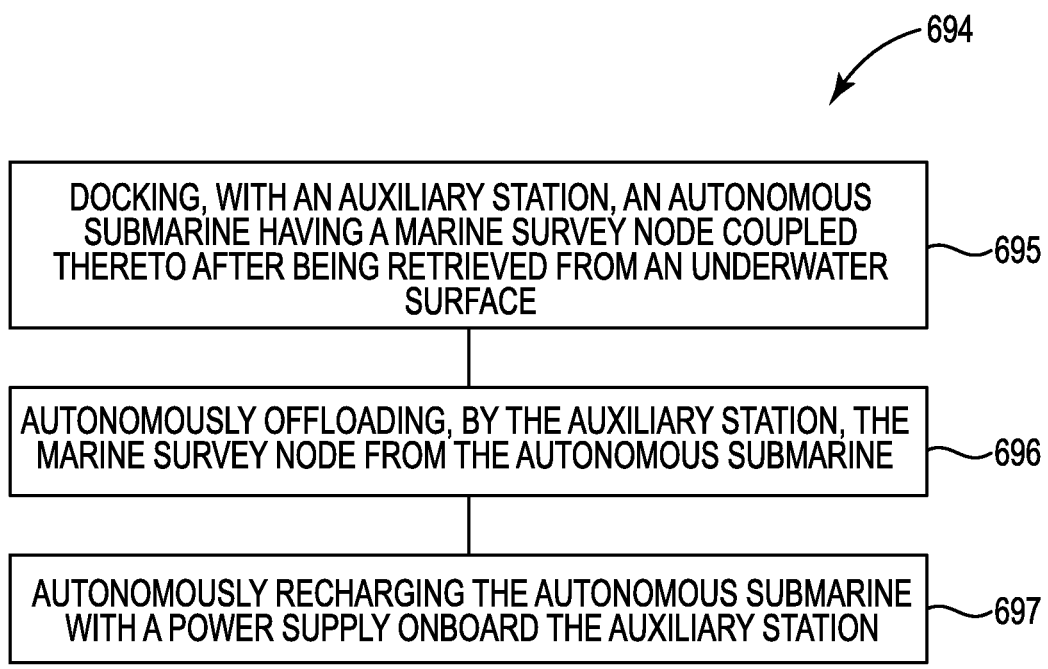
FIG. 6 illustrates an exemplary embodiment of a method for autonomous retrieval of marine survey nodes.

FIG. 6 is an exemplary embodiment of a method 694 for autonomous retrieval of marine survey nodes. At 695, the method 694 can include docking, with an auxiliary station, an autonomous submarine having a marine survey node coupled thereto after being retrieved from an underwater surface. At 696, the method 694 can include autonomously offloading, by the auxiliary station, the marine survey node from the autonomous submarine. At 697, the method 694 can include autonomously recharging the autonomous submarine with a power supply onboard the auxiliary station.

Although not illustrated in FIG. 6, in at least one embodiment, the method 694 can include downloading, by the auxiliary station, marine survey data from the retrieved marine survey node and autonomously generating an image of a subsurface formation from the marine survey data using a data processing system onboard the auxiliary station.

Although not illustrated in FIG. 6, in at least one embodiment, the method 694 can include autonomously coupling a different marine survey node to the autonomous submarine. The method 694 can include autonomously deploying the autonomous submarine from the auxiliary station having the different marine survey node coupled thereto.

Figure 7:
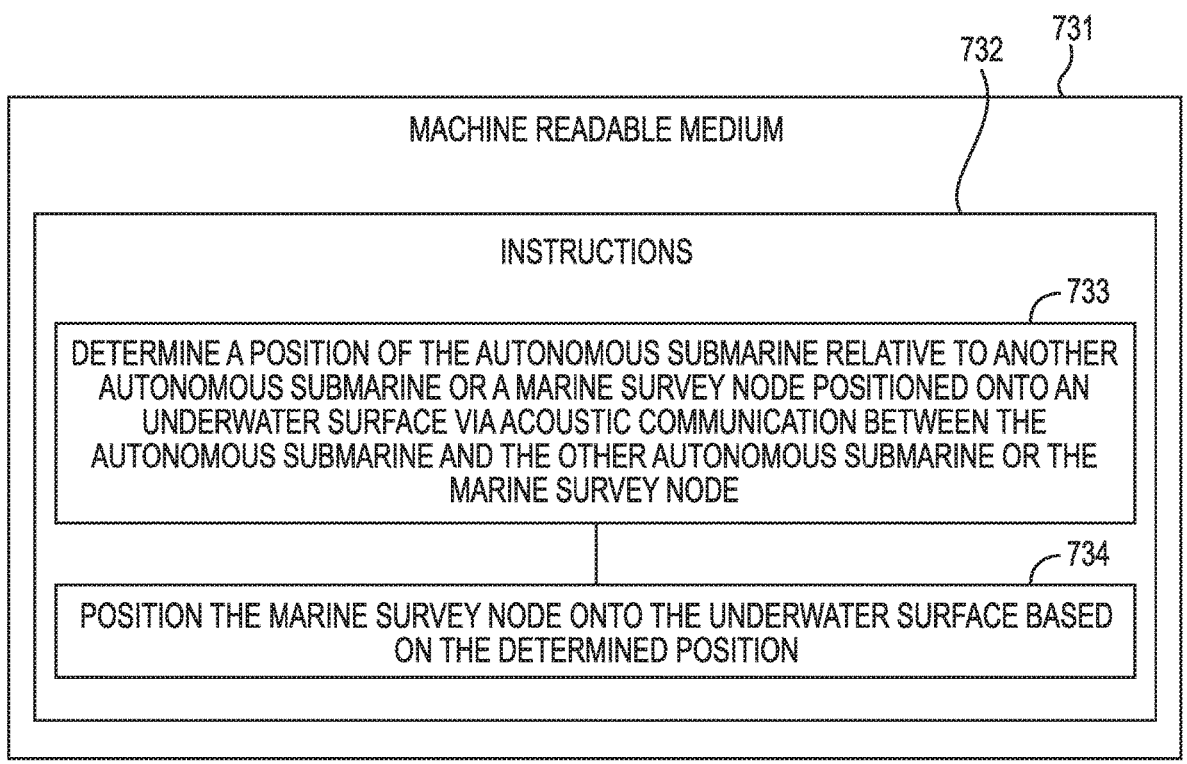
FIG. 7 illustrates an exemplary embodiment of a machine-readable medium for autonomous positioning of marine survey nodes.

FIG. 7 is an exemplary embodiment of a machine-readable medium 731 for autonomous positioning of marine survey nodes. The machine-readable medium 731 can store instructions 732, such as machine-readable instructions. The instructions 732 can be program instructions executable to implement a particular function. For example, the instructions 732 can be executable by a processing resource onboard an autonomous submarine to determine a position of the autonomous submarine relative to another autonomous submarine or a marine survey node positioned onto an underwater surface via acoustic communication between the autonomous submarine and the other autonomous submarine or the other marine survey node as shown at block 733. The instructions 732 can be executed to position the marine survey node onto the underwater surface based on the determined position as shown at block 734.

Although not illustrated in FIG. 7, the instructions 732 can be executed to dock with an autonomous auxiliary station in response to the autonomous submarine positioning the marine survey node onto the underwater surface. The instructions 732 can be executed to receive a different marine survey node stored onboard the autonomous auxiliary station in response to the autonomous submarine docking with the autonomous auxiliary station. The instructions 732 can be executed to receive power from a power supply onboard the autonomous auxiliary station while docked with the autonomous auxiliary station.

Figure 8:
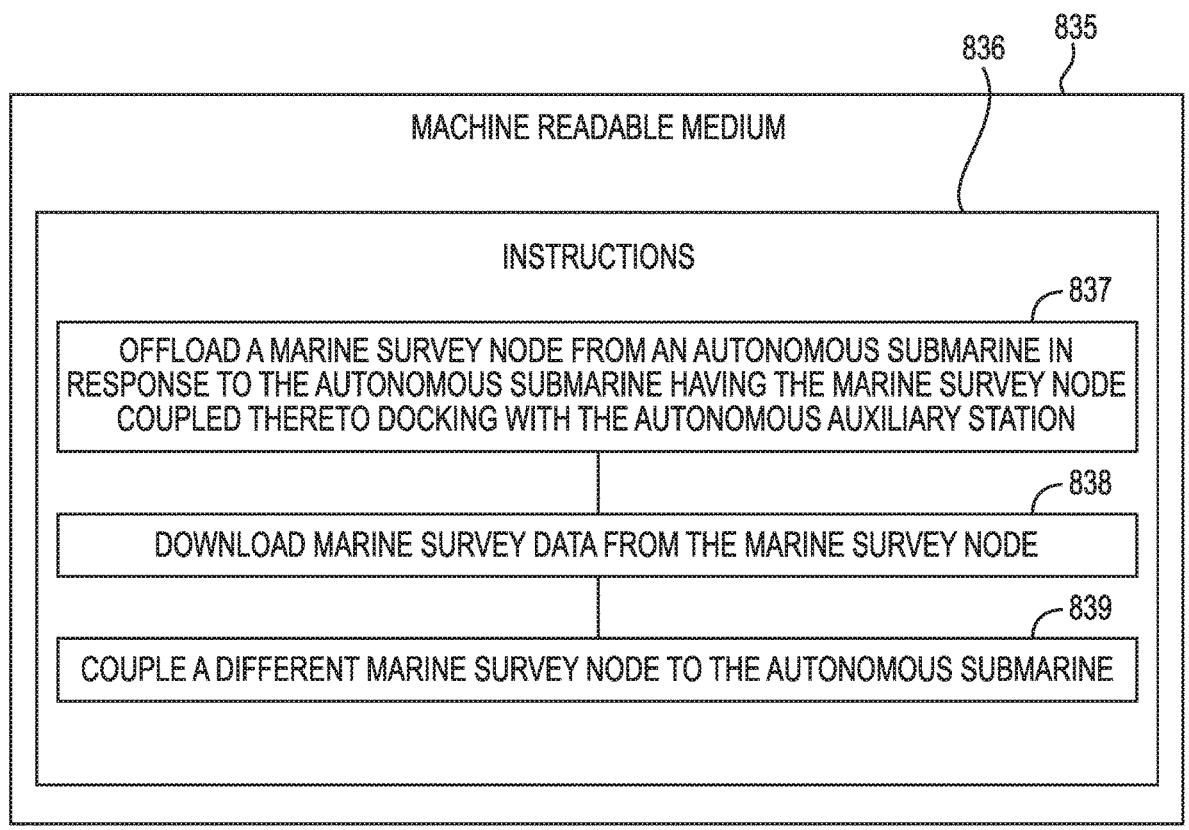
FIG. 8 illustrates an exemplary embodiment of a machine-readable medium for autonomous retrieval of marine survey nodes.

FIG. 8 is an exemplary embodiment of a machine-readable medium 835 for autonomous retrieval of marine survey nodes. The machine-readable medium 835 can store instructions 836, such as machine-readable instructions. The instructions 836 can be program instructions executable to implement a particular function. For example, the instructions 836 can be executed by a processing resource onboard an auxiliary station, such as an autonomous auxiliary station, to offload a marine survey node from an autonomous submarine in response to the autonomous submarine having the marine survey node coupled thereto docking with the autonomous auxiliary station as shown at block 837. The instructions 836 can be executed to download marine survey data from the marine survey node as shown at block 838. The instructions 836 can be executed to couple a different marine survey node to the autonomous submarine as shown at block 839.

Although not illustrated in FIG. 8, the instructions 836 can be executed to determine a location of the autonomous auxiliary station relative to a marine survey plan and determine a position of the autonomous auxiliary station relative to the autonomous submarine when the autonomous submarine is not docked with the autonomous auxiliary station. The instructions 836 can be executed to determine a rendezvous location based on the location and the position, navigate the autonomous auxiliary station to the rendezvous location, and dock with the autonomous submarine at the rendezvous location. The instructions 836 can be executed to determine a deployment location based on the marine survey plan and the rendezvous location, navigate the autonomous auxiliary station to the deployment location, and deploy the docked autonomous submarine from the autonomous auxiliary station at the deployment location.

In accordance with at least one embodiment of the present disclosure, a geophysical data product may be produced or manufactured. An autonomous submarine having a marine survey node coupled thereto can navigate from an auxiliary station to a position relative to another autonomous submarine or another marine survey node. The marine survey node can be positioned by the autonomous submarine onto an underwater surface at the position. Marine survey data can be collected with the positioned marine survey node. The autonomous submarine can dock with the auxiliary station. The autonomous submarine can receive power from a power supply onboard the auxiliary station. In at least one embodiment a result of the method to manufacture, such as the collected marine survey data, can be recorded in a tangible machine-readable medium, thereby completing the manufacture of the geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a modular dock configured to be attached to and detached from a marine surface vessel such that, during a marine survey node deployment or retrieval operation conducted in a body of water, at least a first portion of the modular dock remains fixedly attached to the marine surface vessel;
    a first docking interface disposed on the first portion of the modular dock and configured to removably couple with a corresponding second docking interface disposed on a submarine in the body of water; and
    wherein the modular dock is further configured to couple a marine survey node to the submarine, or to offload the marine survey node from the submarine, while the second docking interface on the submarine is coupled with the first docking interface on the modular dock.

2. The system of claim 1:
    further comprising a plurality of the modular docks; and
    wherein each of the plural modular docks is configured to be attached to another of the plural modular docks.

3. The system of claim 2, wherein:
    each of the plural modular docks is configured to be attached to the surface vessel along at least one peripheral side of the surface vessel such that a lower portion of each modular dock extends into the body of water and an upper portion of each modular dock remains above the body of water.

4. The system of claim 3:
    further comprising the surface vessel; and
    wherein the surface vessel is a flat bottom vessel.

5. The system of claim 3:
    further comprising the surface vessel; and
    wherein the surface vessel is autonomous.

6. The system of claim 1, wherein:
    the modular dock is configured to be attached to the surface vessel along a peripheral side of the surface vessel such that a lower portion of the modular dock extends into the body of water and an upper portion of the modular dock remains above the body of water.

7. The system of claim 1, wherein:
    the modular dock further comprises a marine survey node dispenser configured to store a plurality of marine survey nodes and to dispense one or more of the stored marine survey nodes; and
    the modular dock is configured to couple a dispensed one of the marine survey nodes to the submarine.

8. The system of claim 7, wherein:
    the modular dock is further configured to offload a previously-deployed marine survey node from the submarine and to place the previously-deployed marine survey node in the dispenser.

9. The system of claim 8, wherein:
    the modular dock is further configured to recharge a battery of the previously-deployed marine survey node.

10. The system of claim 8, wherein:
    the modular dock is further configured to download marine survey date from the previously-deployed marine survey node.

11. The system of claim 1, wherein:
    the first docking interface on the modular dock is configured to recharge a power supply of the submarine.

12. The system of claim 1:
    further comprising the submarine; and
    wherein the submarine comprises a docking interface configured to interface with a complementary docking interface of the modular dock.

13. The system of claim 12:
    wherein the submarine is configured to receive power through the docking interface.

14. The system of claim 12:
    wherein the submarine is configured to receive instructions through the docking interface.

15. The system of claim 1:
    further comprising the submarine; and
    wherein the submarine comprises a rotatable arm having a mechanism thereon that is configured to releasably attach to the marine survey node.

16. The system of claim 15, wherein:
    the rotatable arm is configured to rotate the mechanism to a position above the submarine for receiving the marine survey node from the modular dock or for offloading the marine survey node to the modular dock.

17. The system of claim 15, wherein:
the rotatable arm is configured to rotate the mechanism to a position below the submarine for deploying the marine survey node on an underwater surface or for retrieving the marine survey node from the underwater surface.

18. The system of claim 15, wherein:
the mechanism comprises a solenoid and a pin for releasably engaging the marine survey node.

19. The system of claim 15, wherein:
the submarine and the rotatable arm are configured to offload the marine survey node to the modular dock or to receive the marine survey node from the modular dock without the submarine otherwise being physically coupled to the surface vessel.

20. The system of claim 1:
further comprising the submarine; and
wherein the submarine is configured to be coupled to a plurality of the marine survey nodes while the submarine is docked with the modular dock.

21. The system of claim 1, wherein:
the first docking interface on the modular dock is configured to transfer data to or from the submarine.

* * * * *